(12) United States Patent
Uchida

(10) Patent No.: US 6,308,129 B1
(45) Date of Patent: Oct. 23, 2001

(54) METHOD AND APPARATUS FOR AUTOMATICALLY STOPPING ENGINE IDLING OF AUTOMOTIVE VEHICLE DURING STOP OF VEHICLE

(75) Inventor: Masaaki Uchida, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/471,124

(22) Filed: Dec. 23, 1999

(30) Foreign Application Priority Data

Dec. 28, 1998 (JP) .................................. 10-372677

(51) Int. Cl.⁷ .................................................. B60K 41/20
(52) U.S. Cl. .................................. 701/112; 477/203
(58) Field of Search ................... 701/112; 477/203–206; 123/179.4; 290/38 E

(56) References Cited

U.S. PATENT DOCUMENTS

| | | | |
|---|---|---|---|
| 4,286,683 | * 9/1981 | Zeigner et al. | 123/179.4 |
| 5,535,123 | 7/1996 | Rump et al. | 364/426.02 |
| 5,615,660 | 4/1997 | Iwano et al. | 123/680 |

FOREIGN PATENT DOCUMENTS

| | | |
|---|---|---|
| 8-291725 | 11/1996 | (JP). |
| 11-324755 | * 11/1999 | (JP). |

OTHER PUBLICATIONS

JPO abstract for JP 60–40742, Goto et al, Mar. 4, 1985.*

* cited by examiner

*Primary Examiner*—Andrew M. Dolinar
(74) *Attorney, Agent, or Firm*—Foley & Lardner

(57) ABSTRACT

In method and apparatus for automatically stopping an engine idling for an automotive vehicle, a vehicular velocity it detected, a brake manipulated variable of a brake manipulator is detected, the brake manipulated variable is compared with a predetermined criterion to determine whether a brake manipulator is operated, the engine is stopped when the vehicular velocity is detected to be zero and the brake manipulator is determined to be operated, the engine is re-stated when an operation of the brake manipulator is released the brake manipulated variable is determined after the vehicular velocity is zero and the brake manipulator is operated, and the predetermined criterion is updated on the basis of the learning value.

12 Claims, 4 Drawing Sheets

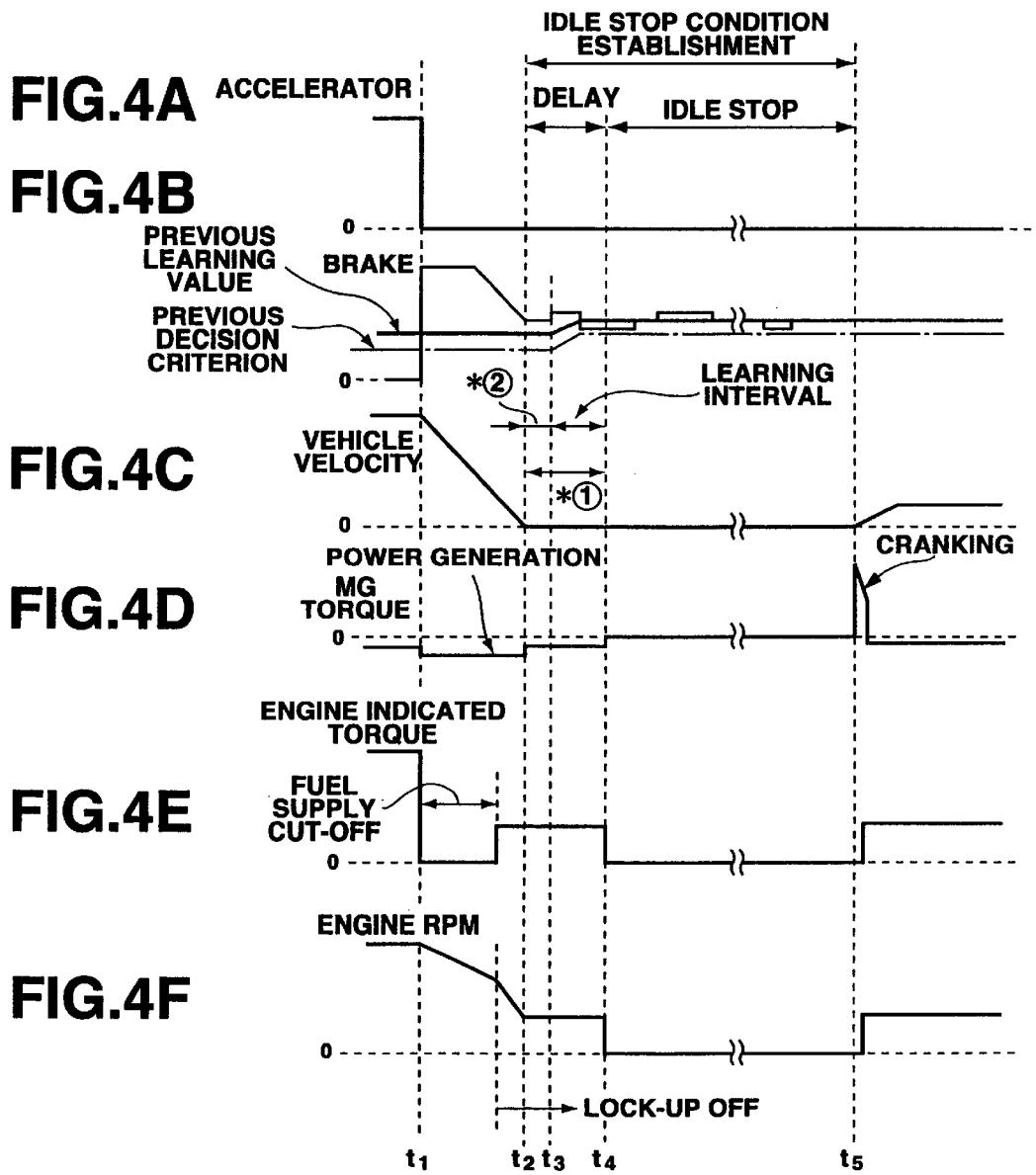

METHOD AND APPARATUS FOR AUTOMATICALLY STOPPING ENGINE IDLING OF AUTOMOTIVE VEHICLE DURING STOP OF VEHICLE

BACKGROUND OF THE INVENTION a) Field of the Invention

The present invention relates generally to method and apparatus for automatically stopping engine idling of an automotive vehicle during a stop of the vehicle and, particularly relates to a technique for accurately detecting an operation of a brake pedal or brake manipulator.

b) Description of the Related Art

In order to improve a fuel consumption and to suppress an emission of exhaust gas, a, so-called, idle stop systems which stops automatically the vehicular engine (the engine idling) during the stop of the vehicle such as a situation of the vehicle to wait for a turn of a go signal has been proposed.

A Japanese Patent Application First Publication No. Heisel 8-291725 published on Nov. 5, 1996 exemplifies a previously proposed idle stop system in which the engine is automatically stopped in a case where a vehicle driver depresses a brake pedal during a zero vehicular velocity and the engine is automatically started in a case where the brake pedal depression is released to re-start the vehicle.

SUMMARY OF THE INVENTION

However, in the previously proposed engine idling stop system, when a manipulated variable (viz., a depression depth) of the brake pedal is in excess of a predetermined criterion regardless of a vehicular driving condition, a controller of the system determines a BRAKE PEDAL ON (the brake pedal is depressed). If the depression, depth is shallower than the predetermined criterion, the controller determines a BRAKE PEDAL OFF. Hence, a determination accuracy of the manipulation of the brake pedal is low.

That Is to say, since a brake force required to force the vehicle in a stopped state is different depending on the vehicular driving condition (e.g., a presence or absence of a creep) and is different depending on a gradient of a road surface on which the vehicle is held in the stopped state or depending on an individual driver, the previously proposed automatic engine idling stop system cannot take these requirements into consideration.

Hence, if the predetermined criterion is set toward a deeper depression depth side than an optimum depth value, the controller does not determine the BRAKE ON even if the driver depresses the brake pedal so that the engine cannot be executed to fall in the engine idling stop state. In addition, if the predetermined criterion is set toward a brake pedal release side shallower than the optimum depth value (in a unit of angle), the controller determines with a delay in time that the brake pedal is released even if the depression of the brake pedal is released so that the brake force is released before the re-start of the engine and an instantaneous reverse run (short-term) of the vehicle could occur when the vehicle stands on an up-hill (an ascending slope).

It is therefore an object of the present invention to provide apparatus and method for automatically stopping the engine idling for the automotive vehicle in which a determination accuracy of the brake manipulation can be improved and the engine can be stopped and re-started at appropriate timings.

According to one aspect of the present invention, there is provided with a method for automatically stopping an engine idling for an automotive vehicle, comprising: detecting a vehicular velocity; detecting a brake manipulated variable of a brake manipulator; comparing the brake manipulated variable with a predetermined criterion of the brake pedal manipulation to determine whether a brake manipulator is operated; stopping the engine when detecting that the vehicular velocity is zero and determining that the brake manipulator is operated; re-starting the engine when an operation of the brake manipulator is released; learning the brake manipulated variable after the vehicular velocity is zero and determining that the brake manipulator is operated; and updating the predetermined criterion on the basis of the learning value.

According to another aspect of the present invention, there is provided with an apparatus for automatically stopping an engine idling for an automotive vehicle, comprising: a vehicular velocity sensor to detect a vehicular velocity; a brake sensor to detect a brake manipulated variable; a controller programmed to compare the brake manipulated variable with a predetermined criterion to determine whether a brake manipulator is operated, to stop the engine when the vehicular velocity is detected to be zero and determining that the brake manipulator is operated, the engine being re-started when an operation of the brake manipulator is released, to learn the brake manipulated variable after the vehicular velocity is zero and determining that the brake manipulator is operated, and to update the predetermined criterion on the basis of the learning value.

According to a still another object of the present inventions there is provided with an apparatus for automatically stopping an engine idling for an automotive vehicle, comprising: means for detecting a vehicular velocity; means for detecting a brake depression angle of a brake pedal; means for comparing the brake depression angle with a predetermined criterion of the brake pedal depression angle to determine whether the brake pedal is depressed; means for stopping the engine when detecting that the vehicular velocity is zero and the comparing means determines that the brake pedal is depressed; means for re-starting the engine when a depression of the brake pedal is released; means for learning the brake pedal depression angle after the vehicular velocity is zero and determining that the brake pedal is depressed; and means for updating the predetermined criterion on the basis of the learning value.

This summary of the invention does not necessarily describe all necessary features so that the invention may also be at sub-combination of these described features.

BRIEF DESCRIPTION OF THE DRAWINGS

FIGS. 4A, 4B, 4C, 4D, 4E and 4F are integrally a timing chart on an engine idling stop and restart executed in the automatic engine idling stop apparatus shown in FIG. 1A.

DETAILED DESCRIPTION OF PREFERRED EMBODIMENT

Reference will hereinafter be made to the drawings in order to facilitate a better understanding of the present invention.

Figure 1A:
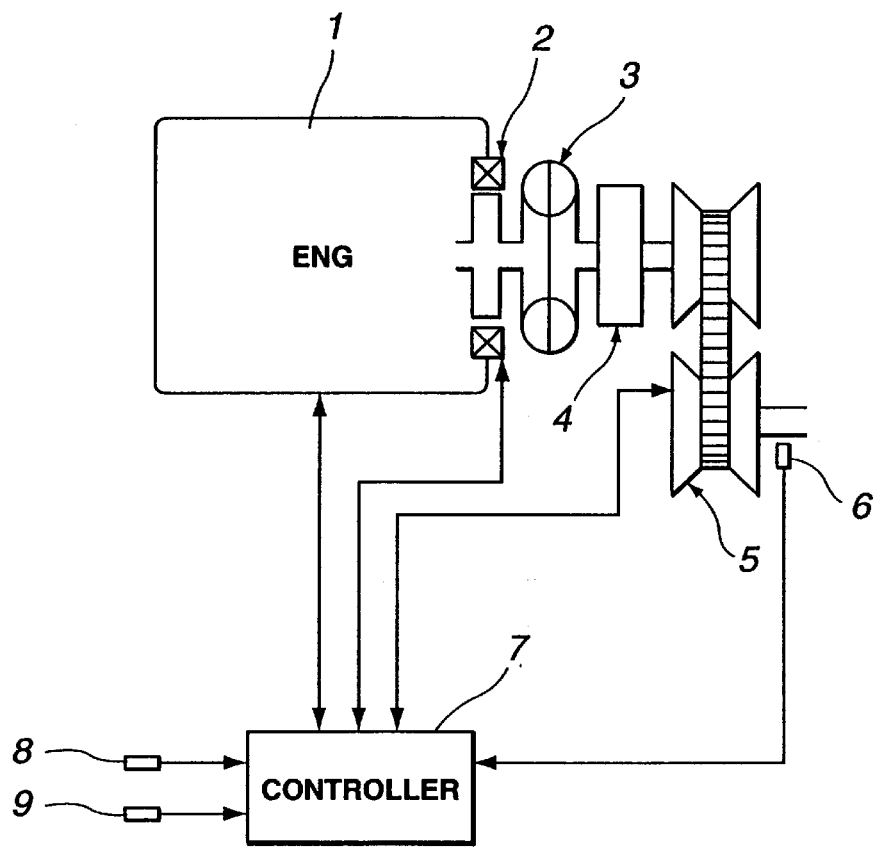
FIG. 1A is a schematic block diagram of an engine controlling system to which an apparatus for automatically stopping an engine idling in a preferred embodiment according to the present invention is applicable.

FIG. 1A shows a rough configuration of an engine control system to which an apparatus for automatically stopping an engine idling according to the present invention is applicable.

In FIG. 1A, a vehicular engine 1 is linked to a wheel axle (not shown) via a torque converter 3, a forward-and-reverse switching mechanism 4, a belt-type continuously variable transmission 5. In addition, a motor generator 2 is installed on a crankshaft of the engine to enable a switching between a drive and a power generation.

A controller 7 calculates a fuel supply quantity (fuel injection quantity) which matches with an intake air quantity on the basis of the intake air quantity measured by means of an air-flow meter (not shown), an engine speed, and a phase of an engine revolution measured by means of a crank angle sensor (not shown), and an ignition timing which matches with an engine load, and the engine revolution, drives fuel injectors sequentially to supply spark plugs at timings of the ignition in accordance with the ignition timing.

In addition, the controller 7 receives a signal from a vehicular velocity sensor 6 indicating a vehicular velocity, a signal from a brake sensor 8 detecting a brake manipulated variable, and a signal from an accelerator sensor 9 indicating an accelerator manipulated variable. The controller 7 determines a brake manipulation on the basis of these signals and controls an idle stop and a re-start of the engine 1.

That is to say, if the controller 7 determines that the vehicular velocity is zero and a brake pedal is depressed, the controller 7 stops the fuel injection by the fuel injectors and the ignition by the spark plugs to stop the engine 1 after a predetermined interval of time. Thereafter, if the controller 7 determines that the depression of the brake pedal is released, the controller 7 outputs a motor generator control signal to drive the motor generator 2 to start a cranking and re-start the fuel injection and the ignition so as to re-start the engine 1.

Furthermore, the controller 7 carries out a learning of a brake manipulated variable as will be described later in order to improve a detection accuracy of the manipulation of the brake pedal and updating of a predetermined criterion on the brake.

It is noted that the brake sensor 8 is a sensor to detect directly a depression stroke (depth) of the brake pedal and, in place of the brake sensor, the brake sensor may alternatively be a sensor to detect a (braking) liquid pressure of the brake.

Figure 1B:
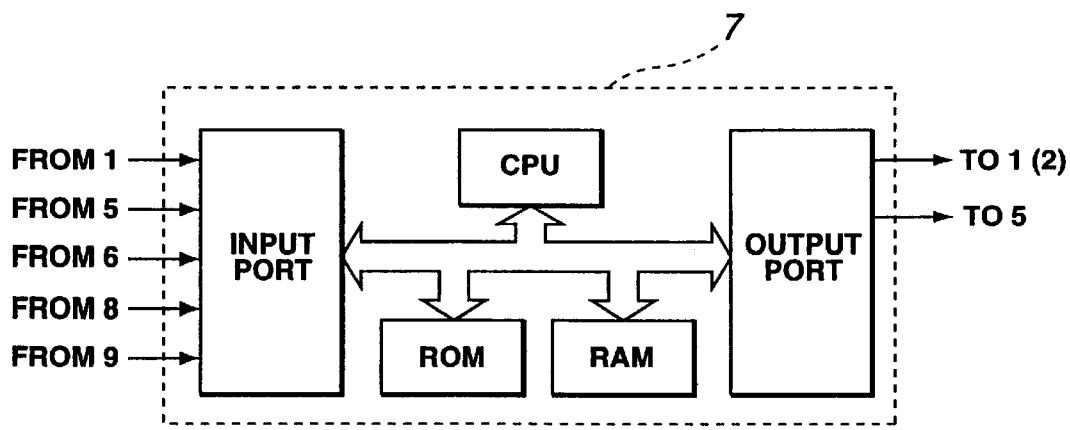
FIG. 1B is a schematic circuit block diagram of a controller shown in FIG. 1A.

As shown in FIG. 1B, the controller 7 includes a microcomputer having a CPU, a ROM, a RAM, an Input port, an Output port, and a common bus.

Figure 2:
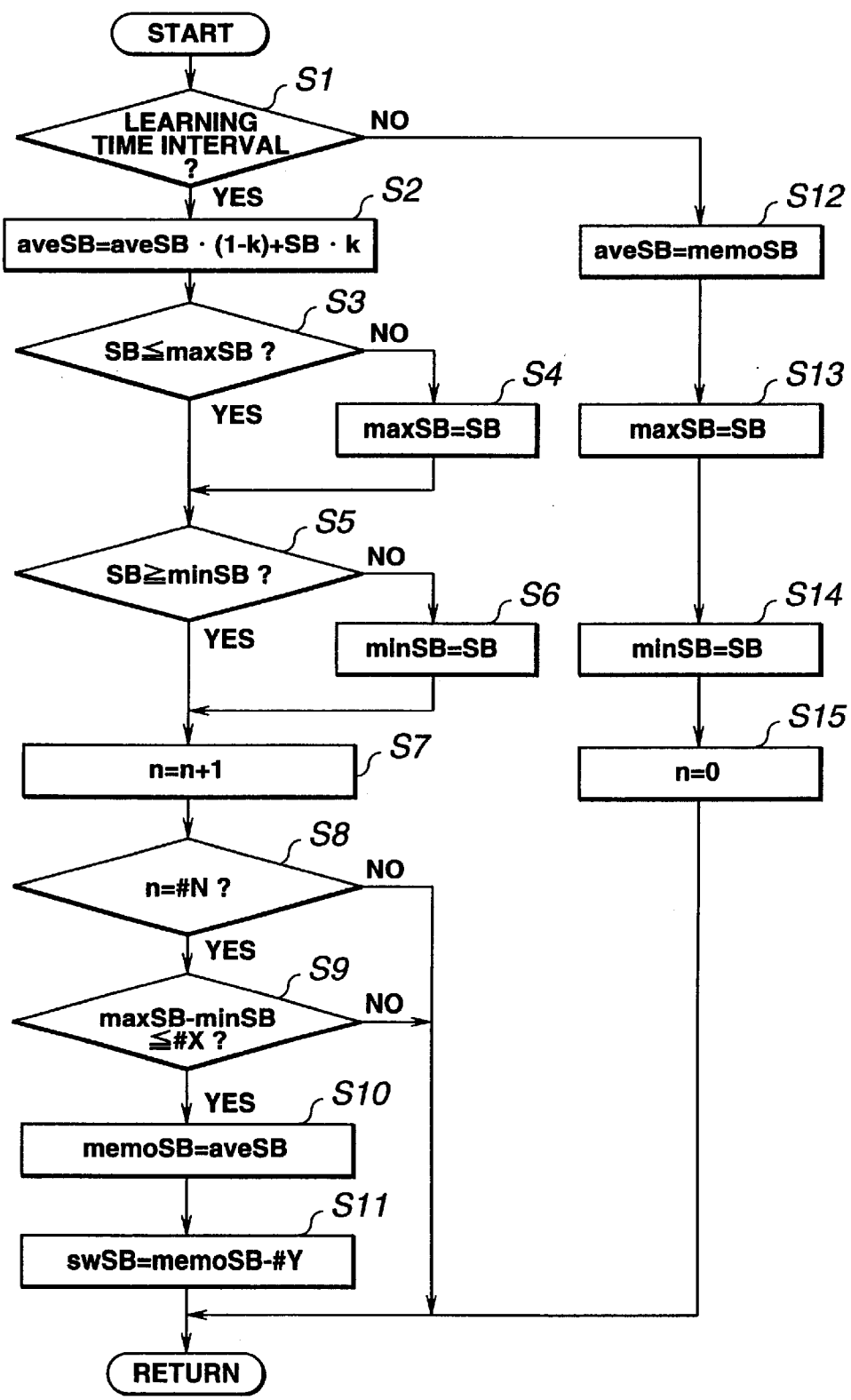
FIG. 2 is an operational flowchart for explaining processes of learning a brake manipulated variable and updating a predetermined criterion executed by the controller shown in FIGS. 1A and 1B.
Figure 3:
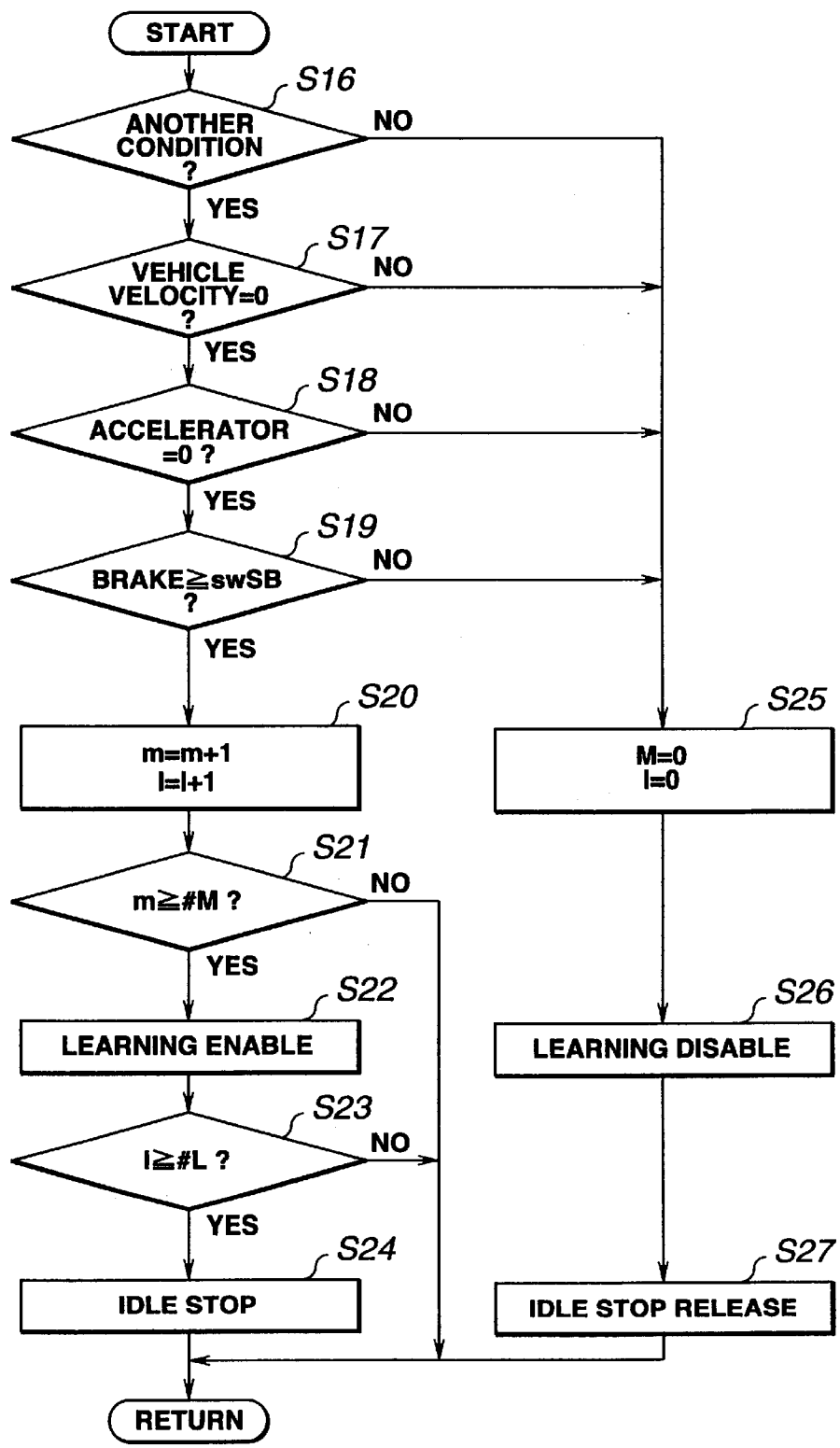
FIG. 3 is another operational flowchart for explaining processes of determining an enable of an engine idling stop and determining an enable of learning the brake manipulated variable.

FIGS. 2 and 3 show an operation of an idling stop control executed by the controller 7.

Processes of the learning of a brake manipulated variable carried out by the controller 7 and of updating the predetermined criterion will be described below with reference to the flowchart of FIG. 2.

At a first step S1, the CPU of the controller 7 determines whether the present time is in a learning interval of time (viz., whether a learning has been enabled). If the CPU of the controller 7 determines that the present time is in the learning interval of time (Yes) at the step S1, the routine goes to a step S2.

If NO at the step S1, the routine goes to a step S12. The learning interval of time is allocated to a predetermined time duration in delay interval of time from a time at which a condition of the idling stop is established to a time at which the engine 1 is stopped by means of a timer generated by a clock generator in the CPU.

At the stop S2, the CPU of the controller 7 calculates an average value aveSB of the brake manipulated variable SB as follows; aveSB=aveSB (1−K)+SB K, wherein K denotes a numerical value of a decimal fraction between 0 and 1 (for example, 0.25).

It is noted that the average value aveSB of the brake manipulated variable is, so-called, an average value (a moving average in a time series). However, in place of the average value thereof, the average of the sampled values during the predetermined period of time may merely be used as the average value. Or alternatively, a value passed through a low pass filter may be used as the average value.

At steps S3 and S4, the CPU of the controller 7 calculates a maximum value maxSB of the brake manipulated variable SB.

At steps S5 and S6, the CPU of the controller 7 calculates a minimum value minSB of the brake manipulated variable SB.

At a step S7, the CPU of the controller 7 increments a counter n (n+1→n) by one.

If the counter n indicates the same value as a predetermined value #N (n=#N) at a step S8, the routine goes to a step S9.

If the counter n does not indicate the same value as the predetermined value #N (n≠#N) (No) at the step S8, the present routine is ended (RET).

At the step S9, the CPU of the controller 7 compares a deviation between the maximum value maxSB and the minimum value minSB with a predetermined value #X (the predetermined value #X is a preset value) equal to or less than 50% (preferably, 10%) the average value SB in order to avoid the learning from being carried out under an unstable situation of the brake manipulated variable SB.

At the step S10, the average value aveSB which is the result that #N number of times sampling operations are carried out is assigned Into the learning value memoSB. This memoSB corresponds to the brake manipulated variable to generate the brake force to stop the vehicle against a creeping force.

At the subsequent step S11, the controller 7 updates the predetermine criterion swSBto decide whether the brake pedal is depressed to a value of a subtraction of a predetermined value #Y from a deviation of the average value aveSB from the learning value menoSB.

The reason of subtracting the predetermined value #Y is that a fluctuation to some degree is present in the brake manipulation with the vehicular driver. The predetermined value #Y is present so as to enable to secure a sufficient margin to the fluctuation on the brake manipulated variable. It is noted that the predetermined criterion swSB is provided with limitations of the maximum value and minimum value, and a hysteresis to prevent a chattering.

It is also noted that if not learning interval time (No) at the stop S1, the routine goes to steps S12 through S15 in which the learning value of memoSB is assigned into the average value of aveSB, the value of SB is assigned into maxSB, and into minSB, and n is set to zero and the present routine is ended (RET) to prepare the next learning.

Next, the processes of determining the enable to make the idling stop and of determining the enable to carry out the learning will be described with reference to the flowchart of FIG. 3.

First, at a step S16, the CPU of the controller 7 determines whether a coolant temperature of the engine 1 and an oil temperature of the variable transmission 5 are equal to or greater than respective predetermined values. That is to say, at the step S16, the CPU of the controller 7 determines whether the idle stop conditions other than the vehicular velocity, the accelerator manipulated variable, and the brake manipulated variable are established. If not satisfied (No) at the step S16, the routine goes to a step S25.

At the step S17, the CPU of the controller 7 determines whether the vehicular velocity based on the vehicular velocity sensor 6 is zeroed. If the vehicular velocity is zero at the step S17 (Yes), the routine goes to the step S18. If not satisfied (No) at the stop S17, the routine goes to a step S25.

At the step S18, the CPU of the controller 7 determines whether the accelerator manipulated variable indicates zero (ACCELERATOR=0, viz., the accelerator is not depressed on the basis of the signal outputted from the accelerator sensor 9). If accelerator manipulated variable indicates zero (Yes) at the step S18, the routine goes to a step S19. If the accelerator manipulated variable does not indicate zero (No) at the step S18, the routine goes to the step S25.

At the step S19, the CPU of the controller 7 compares the brake manipulated variable SB detected by means of the brake sensor 8 with a predetermined criterion swSB to determine whether the brake pedal has been depressed.

If the brake manipulated variable SB is equal to or greater than swSB (Yes) at the step S19, the routine goes to a stop S20. If (No) at the step S19, the routine goes to the step S25.

At the step S20 the counters m and l are incremented by one (m+1→m, l+1→l). At the step S21, the CPU of the controller 7 determines whether the counter m is greater than the predetermined value #M. If the counter m is equal to or greater than the predetermined value #M (m≧#M) at the step S21, the routine goes to a step S22 in which the learning is enabled to carry out. If (m<#M) (No) at the step S21, the present routine is ended (RET). It is noted that the predetermined value #M is set so that a time duration it takes from a time at which the vehicle stops to a time at which the brake manipulated variable becomes stable.

At the step S22, the learning is enabled.

The routine thereafter goes to a stop S23.

If l≧#L at the step S23 (#L denotes a predetermined value), the routine goes to a step S24.

At the step S24, the CPU of the controller 7 enables the idle stop (engine stop). If l<#L at the step S23 (No), the routine is ended (RET).

It Is noted that the predetermined value #L is set to be larger than a sum of the predetermined value #M and #N in order to enable the learning during the delay time interval of the idle stop, viz., before the engine stops.

Next, an operation of the automatic engine idling stop system in the preferred embodiment, viz., an example of execution sequence of the idle stop and re-start will be described with reference to FIGS. 4A through 4F. This shows the pattern of varying the learning value of the brake and predetermined criterion in accordance with the brake manipulated variable and vehicular velocity.

At a time t1, the vehicular driver has released the depression of the accelerator pedal and depressed the brake pedal to decelerate and stop the vehicle. The engine revolution velocity becomes idle at a time point at Which the lock-up clutch is released. The motor generator 2 is acted as a power generator when the engine is operating and executes an energy re-generation while the vehicle is decelerated.

Then, at a time point of t2, when the brake manipulated variable is compared with the predetermined criterion and the brake pedal is depressed, the controller 7 determines that the condition of the idle stop is established. Then, the learning of the brake manipulated variable during the predetermined interval of time #N from a time point t3 at which the predetermined period of time #M has passed after the time point t2. At this time, the predetermined criterion swSB is updated to a value of the subtraction of the predetermined value #Y from the learning value memoSB. This learning causes the brake manipulated variable required to stop the vehicle against the creeping force. The predetermined criterion swSB is updated by subtracting the predetermined value #Y from the learning value memoSB. A sufficient margin can be provided against the fluctuation of the brake manipulated variable by setting such the predetermined criterion swSB as described above. It is noted that the stop of the engine 1 is executed at a time point t4 after the delay time #L upon the establishment of the idle stop conditions.

Thereafter, at a time point t5, the controller 7 compares the brake manipulated variable with the predetermined criterion swSB and determines that the depression of the brake pedal is released. At this time point t5, the motor generator 2 starts the cranking to re-start the engine 1. It is noted that when a torque is started to be developed, the motor generator 2 is switched into the operation as the generator.

In this way, according to the present invention, when the predetermined idle stop conditions are established, the engine is stopped. During the delay time interval set during the time duration from the time at which the vehicle stops to the time at which the engine is stopped, the brake manipulated variable to develop the brake force required to stop the vehicle against the creeping force is learned. With the value of the subtraction of the predetermined value from the learning value as the predetermined criterion, the controller determines whether the brake pedal is depressed.

Consequently, a highly accurate determination of the brake manipulation can be made so that a stop or restart of the engine can be carried out at an appropriate timing in the automatically idling stop apparatus.

It is noted that X·① in FIG. 4C denotes the predetermined value of #L, X·② in FIG. 4C denotes the predetermined value of #M, and the LEARNING INTERVAL in FIG. 4C corresponds to #N.

It Is also noted that a brake manipulator defined in the claims corresponds to the brake pedal and the manipulated variable corresponds to a depression angle of the brake pedal by which the vehicle driver depresses the brake pedal.

It is also noted that the term of IDLE STOP shown in FIG. 4A means that the engine idling condition is halted, viz., the drive of the engine 1 is stopped with the fuel injection stopped and the ignition stopped.

The entire contents of a Japanese Patent Application No. Heisei 10-372677 (filed in Japan on Dec. 28, 1998) are herein incorporated by reference.

Although the present invention has been described above by reference to certain embodiments of the present invention, the present invention is not limited to the embodiments described above.

Modifications and variations of the embodiments described above will occur to those skilled in the art, in the light of the above teachings. The scope of the present invention is defined with reference to the following claims.

What is claimed is:

1. A method for automatically stopping an engine idling for an automotive vehicle, comprising:

detecting a vehicular velocity;

detecting a brake manipulated variable of a brake manipulator;

comparing the brake manipulated variable with a predetermined criterion of the brake pedal manipulation to determine whether a brake manipulator is operated;

stopping the engine when detecting that the vehicular velocity is zero and determining that the brake manipulator is operated;

re-starting the engine when an operation of the brake manipulator is released;

determining a learning value of the brake manipulated variable after the vehicular velocity is zero and determining that the brake manipulator is operated; and updating the predetermined criterion on the basis of the learning value.

2. A method for automatically stopping an engine idling for an automotive vehicle as claimed in claim 1, wherein the brake manipulated variable learning value is learned during a duration in time from a time at which the vehicular velocity is zero to a time at which the brake manipulator is operated.

3. A method for a automatically stopping an engine idling for an automotive vehicle as claimed in claim 1, further comprising setting a delay time duration from a time at which the vehicular velocity is zero and the brake manipulator is operated to a time at which the engine is stopped and wherein the brake manipulated variable learning value is learned during the set delay time.

4. A method for automatically stopping an engine idling for an automotive vehicle as claimed in claim 3, wherein an average value aveSB of the brake manipulated variable during a predetermined interval of time for the delay time duration is the learning value.

5. A method for automatically stopping an engine idling for an automotive vehicle as claimed in claim 4, wherein the learning of the brake manipulated variable learning value is inhibited when a deviation between maximum and minimum values of the brake manipulated variables during the predetermined interval of time is equal to or greater than a predetermined value.

6. A method for automatically stoppling an engine idling for an automotive vehicle as claimed in claim 5, wherein the predetermined value #X is equal to or less than 50% the average value aveSB of the brake manipulated variable.

7. A method for automatically stopping an engine idling for an automotive vehicle as claimed in claim 4, wherein the predetermined criterion is updated to a predetermined small value by a predetermined value #Y from the learning value.

8. A method for automatically stopping an engine idling for an automotive vehicle as claimed in claim 7, wherein the predetermined value #Y is equal to or greater than a deviation from the average value aveSB to the minimum value minSB.

9. A method for automatically stopping an engine idling for an automotive vehicle as claimed in claim 8, wherein the average value aveSB is calculated as follows:

aveSB=aveSB (1−k)+SB k (, wherein k denotes a constant).

10. A method for automatically stopping an engine idling for an automotive vehicle as claimed in claim 9, wherein the brake manipulator is a brake pedal.

11. An apparatus for automatically stopping an engine idling for an automotive vehicle, comprising;

a vehicular velocity sensor to detect a vehicular velocity;

a brake sensor to detect a brake manipulated variable;

a controller programmed to compare the brake manipulated variable with a predetermined criterion to determine whether a brake manipulator is operated, to stop the engine when the vehicular velocity is detected to be zero and determining that the brake manipulator is operated, the engine being re-started when an operation of the brake manipulator is released, to determine a learning value of the brake manipulated variable after the vehicular velocity is zero and determining that the brake manipulator Is operated, and to update the predetermined criterion on the basis of the learning value.

12. An apparatus for automatically stopping an engine idling for an automotive vehicle, comprising:

means for detecting a vehicular velocity;

means for detecting a brake depression angle of a brake pedal;

means for comparing the brake depression angle with a predetermined criterion of the brake pedal depression angle to determine whether the brake pedal is depressed;

means for stopping the engine when detecting that the vehicular velocity is zero and the comparing means determines that the brake pedal is depressed;

means for re-starting the engine when a depression of the brake pedal is released;

means for determining a learning value of the brake pedal depression angle after the vehicular velocity is zero and determining that the brake pedal is depressed; and means for updating the predetermined criterion on the basis of the learning value.

* * * * *